(12) United States Patent
Bittner et al.

(10) Patent No.: US 8,584,750 B2
(45) Date of Patent: *Nov. 19, 2013

(54) PROCESS FOR TERTIARY MINERAL OIL PRODUCTION USING SURFACTANT MIXTURES

(75) Inventors: Christian Bittner, Bensheim (DE); Oetter Günter, Frankenthal (DE); Jack Tinsley, Mannheim (DE); Christian Spindler, Ludwigshafen (DE); Gabriela Alvarez Jürgenson, Mannheim (DE); Sophie Vogel, Mannheim (DE)

(73) Assignee: BASF SE (DE)

( * ) Notice: Subject to any disclaimer, the term of this patent is extended or adjusted under 35 U.S.C. 154(b) by 415 days.

This patent is subject to a terminal disclaimer.

(21) Appl. No.: 12/903,441

(22) Filed: Oct. 13, 2010

(65) Prior Publication Data

US 2011/0083846 A1 Apr. 14, 2011

Related U.S. Application Data

(60) Provisional application No. 61/251,314, filed on Oct. 14, 2009.

(51) Int. Cl.
*E21B 43/22* (2006.01)
*C09K 8/584* (2006.01)

(52) U.S. Cl.
USPC ........ 166/270.1; 166/275; 166/400; 507/254; 507/255; 507/259; 507/261; 507/262; 507/936

(58) Field of Classification Search
None
See application file for complete search history.

(56) References Cited

U.S. PATENT DOCUMENTS

| 3,811,504 | A | | 5/1974 | Flournoy et al. |
| 3,811,505 | A | | 5/1974 | Flournoy et al. |
| 4,008,768 | A | * | 2/1977 | Birk ........................... 166/270.1 |
| 4,016,932 | A | * | 4/1977 | Kalfoglou ..................... 166/270 |
| 4,059,154 | A | * | 11/1977 | Braden et al. ............... 166/270.1 |
| 4,077,471 | A | | 3/1978 | Shupe et al. |
| 4,371,444 | A | * | 2/1983 | McCoy et al. ................. 507/225 |
| 4,446,079 | A | * | 5/1984 | Hoskin ......................... 562/110 |
| 2006/0185845 | A1 | | 8/2006 | Shpakoff et al. |
| 2006/0189486 | A1 | | 8/2006 | Shpakoff et al. |
| 2009/0270281 | A1 | * | 10/2009 | Steinbrenner et al. ........ 507/237 |
| 2010/0069139 | A1 | * | 3/2010 | Yoshizawa ..................... 463/20 |

FOREIGN PATENT DOCUMENTS

| DE | 4325237 A1 | 2/1995 |
| DE | 10243361 A1 | 4/2004 |
| WO | WO-99/16775 | 4/1999 |
| WO | WO-00/74845 | 12/2000 |
| WO | WO-2006/131541 | 12/2006 |
| WO | WO-2009/124922 | 10/2009 |

* cited by examiner

*Primary Examiner* — George Suchfield
(74) *Attorney, Agent, or Firm* — Novak Druce Connolly Bove + Quigg LLP

(57) ABSTRACT

A process for mineral oil production, especially Winsor type III microemulsion flooding, in which an aqueous surfactant formulation which comprises at least one nonionic surfactant having 8 to 30 ethoxy units, which has a polydispersity of from 1.01 to 1.12, and at least one further surfactant is forced through injection wells into a mineral oil deposit and crude oil is removed from the deposit through production wells.

18 Claims, 1 Drawing Sheet

PROCESS FOR TERTIARY MINERAL OIL PRODUCTION USING SURFACTANT MIXTURES

CROSS REFERENCE TO RELATED APPLICATIONS

This application is a non-provisional of U.S. Provisional Application No. 61/251,314, filed Oct. 14, 2009, the entire disclosure of which is hereby incorporated by reference.

The invention relates to a process for mineral oil production in which an aqueous surfactant formulation which comprises at least one nonionic surfactant having 8 to 30 ethoxy units, which has a polydispersity of from 1.01 to 1.12, and at least one further surfactant differing therefrom is forced through injection wells into a mineral oil deposit and crude oil is removed from the deposit through production wells. The process may in particular constitute Winsor type III microemulsion flooding.

In natural mineral oil deposits, mineral oil is present in the cavities of porous reservoir rocks which are closed off from the earth's surface by impervious covering strata. The cavities may be very fine cavities, capillaries, pores or the like. Fine pore necks may have, for example, a diameter of only about 1 μm. In addition to mineral oil, including proportions of natural gas, a deposit contains water having a higher or lower salt content.

In mineral oil production, a distinction is made between primary, secondary and tertiary production.

In primary production, after drilling into the deposit, the mineral oil flows by itself under the autogenous pressure of the deposit through the well to the surface.

After primary production, the secondary production is therefore used. In secondary production, in addition to the wells which serve the production of the mineral oil, the so-called production wells, further wells are drilled into the mineral oil-carrying formation. Water is forced through these so-called injection wells into the deposit in order to maintain the pressure or to increase it again. By forcing in water, the mineral oil is slowly forced through the cavities in the formation, starting from the injection well, in the direction of the production well. However, this functions only as long as the cavities are completely filled with oil and the more viscous oil is pushed ahead by the water. As soon as the low-viscosity water breaks through cavities, it flows from this time onward along the path of least resistance, i.e. through the resulting channel, and no longer pushes the oil in front of it.

As a rule, only about 30 to 35% of the amount of mineral oil present in the deposit can be extracted by means of primary and secondary production.

It is known that the mineral oil yield can be further increased by tertiary oil production measures. An overview of tertiary oil production is to be found, for example, in Journal of Petroleum Science and Engineering 19 (1998) 265-280. Tertiary oil production includes thermal processes in which hot water or superheated steam is forced into the deposit. As a result of this, the viscosity of the oil is reduced. Gases, such as $CO_2$ and nitrogen, can also be used as a flooding medium.

Tertiary oil production furthermore includes processes in which suitable chemicals are used as assistants for oil production. The situation toward the end of the water flood can be influenced by these and mineral oil held in the rock formation up to that time can also be extracted thereby.

For example, the interfacial tension σ between the mineral oil and the aqueous phase can be reduced by the addition of suitable surfactants. This technique is also known as "surfactant flooding". In particular, surfactants which can reduce σ to values of $<10^{-2}$ mN/m (ultralow interfacial tension) are suitable for this purpose. In this way, the oil droplets are able to change their shape and can be forced through the capillary openings by the flood water.

The oil droplets can then combine to form a continuous oil layer. This has advantages in two respects: firstly, when the continuous oil layer advances through new porous rock, the oil droplets present there can coalesce with the layer. Furthermore, the oil-water interface is substantially reduced by the combination of the oil droplets to form an oil layer, and surfactant no longer required is therefore released. The surfactant released can then mobilize oil droplets remaining in the formation.

The requirements regarding surfactants for tertiary mineral oil productions differ substantially from requirements regarding surfactants for other applications: suitable surfactants for tertiary mineral oil production should reduce the interfacial tension between water and oil (usually about 20 mN/m) to particularly low values of less than $10^{-2}$ mN/m in order to permit sufficient mobilization of the mineral oil. This must take place at the usual deposit temperatures of about 30° C. to about 130° C. and in the presence of water having a high salt content, in particular also in the presence of high proportions of calcium and/or magnesium ions; the surfactants must therefore also be soluble in reservoir water having a high salt content.

Mixtures of surfactants, in particular mixtures of anionic and nonionic surfactants, have already frequently been proposed for meeting these requirements.

U.S. Pat. No. 3,811,505 discloses a mixture of an anionic and a nonionic surfactant for use in deposits whose reservoir water comprises from 0.5 to 0.9% by weight of polyvalent ions. The anionic surfactants are alkanesulfonates or alkylphosphates having in each case from 5 to 25 carbon atoms or alkylarylsulfonates or alkylarylphosphates whose alkyl radical has in each case 5 to 25 carbon atoms. The nonionic surfactants are polyethoxylated alkylphenols which have from 6 to 20 ethoxy groups and whose alkyl radical has 5 to 20 carbon atoms or polyethoxylated aliphatic alcohols having 6 to 20 carbon atoms and from 6 to 20 ethoxy groups.

U.S. Pat. No. 3,811,504 discloses a mixture of 2 different anionic surfactants and a nonionic surfactant for use in deposits whose reservoir water comprises from 0.15 to 1.2% of calcium and magnesium ions. The first anionic surfactant comprises alkanesulfonates or alkylarylsulfonates, and the second comprises alkylpolyethoxysulfates. The nonionic surfactants may be polyethoxylated alkylphenols which have from 6 to 20 ethoxy groups and whose alkyl radical has 5 to 20 carbon atoms, or polyethoxylated aliphatic alcohols having 6 to 20 carbon atoms and from 6 to 20 ethoxy groups.

U.S. Pat. No. 4,077,471 discloses a surfactant mixture for use in a formation whose reservoir water has a salt content of from 7 to 22%. The mixture comprises a water-soluble alkylpolyalkoxyalkanesulfonate or alkylarylpolyalkoxyalkanesulfonate and a water-insoluble nonionic surfactant obtained from an ethoxylated aliphatic alcohol or an ethoxylated, alkyl-substituted aromatic alcohol, the hydrocarbon groups having in each case 8 to 24 carbon atoms and the number of ethoxy groups being from 1 to 20.

US 2006/0185845 A1 discloses the use of a mixture of at least one aliphatic anionic surfactant and a branched aliphatic nonionic surfactant for mineral oil production. The branched aliphatic radical preferably has 10 to 24 carbon atoms and the degree of branching is from 0.7 to 2.5.

US 2006/0189486 discloses the use of a mixture of at least one branched aliphatic anionic surfactant and an aliphatic nonionic surfactant for mineral oil production. The branched aliphatic radical preferably has from 10 to 24 carbon atoms and the degree of branching is from 0.7 to 2.5.

Our prior application WO 2009/124922 discloses surfactants of the general formula iso-$C_{17}H_{35}$—X, in which X is a polar group and iso-$C_{17}H_{35}$ is an alkyl radical having a degree of branching of from 2.8 to 3.7. The document also discloses mixtures of nonionic surfactants of the general formula iso-$C_{17}H_{35}$—O—$(CH_2CH(CH_3)O)_n(CH_2CH_2O)_m$—H with anionic surfactants, n being from 0 to 15, m being from 1 to 20, preferably from 5 to 14, and the sum n+m being from 1 to 35, preferably from 2 to 20. The alkoxylation of the surfactants can be carried out by means of acidic catalysis, KOH catalysis or catalysis by means of DMC catalysts.

In a preferred embodiment of the surfactant flooding, the surfactants should form a microemulsion of Winsor type III with the water phase and the oil phase. The microemulsion (Winsor type III) is not an emulsion comprising particularly small droplets but a thermodynamically stable, liquid mixture of water, oil and surfactants which has a very low interfacial tension and as a rule a very low viscosity. Its three advantages are that

- it produces a very low interfacial tension σ between mineral oil and aqueous phase,
- it generally has a very low viscosity and hence does not become trapped in a porous matrix,
- it is formed even with very small energy inputs and is able to remain stable over an infinitely long period of time (conventional emulsions, in contrast, require relatively high shearing forces, which predominantly do not occur in the reservoir, and are stabilized only kinetically).

The Winsor III microemulsion is in equilibrium with excess water and excess oil. Under these conditions of microemulsion formation, the surfactants occupy the oil/water interface and lower the interfacial tension σ.

Since Winsor III microemulsions are particularly of low viscosity in comparison to other types of emulsion, they are able in the flooding process to go through the porous deposit rock. Conventional emulsions, in contrast, may remain stuck in the porous matrix, clogging it. With Winsor type III microemulsion flooding, therefore, the process is extremely efficient and, unlike an emulsion flooding process, requires significantly less surfactant. With microemulsion flooding, normally, the surfactants, if desired together with cosolvents and/or basic salts (and optionally in the presence of chelating agents) are injected. Thereafter, a solution of thickening polymer is injected for mobility control. A further variant is the injection of a mixture of thickening polymer and also surfactants, cosolvents and/or basic salts (optionally with chelating agent) and, subsequently, a solution of thickening polymer for mobility control. These solutions ought in general to be clear, in order to prevent clogging of the reservoir.

The requirements imposed on surfactants for tertiary mineral oil production differ significantly from requirements imposed on surfactants for other applications: Suitable surfactants for tertiary oil production ought to reduce the interfacial tension between water and oil (typically around 20 mN/m) to particularly low values of less than $10^{-2}$ mN/m, in order to allow sufficient mobilization of the mineral oil. This must take place at the usual deposit temperatures of around 15° C. to 130° C. and in the presence of water with high salt content, not least in the presence of high fractions of calcium ions and/or magnesium ions; the surfactants, therefore, must be soluble even in deposit water with a high salt content.

In order to obtain an optimum result, the proportion of the microemulsion in the water-microemulsion-oil system at a defined amount of surfactant should of course be as great as possible. The parameters used, such as, for example, type, concentration and the mixing ratio of the surfactants used relative to one another, are therefore adapted by a person skilled in the art to the conditions (temperature, salt content) prevailing in a given mineral oil formation.

The problem occurs here that the concentration of the surfactants during the surfactant flooding in the mineral oil formation itself is virtually impossible to keep constant. Firstly, the surfactant flood forced into the injection well mixes with the formation water in the mineral oil formation, it not being absolutely necessary for the proportion of the formation water relative to the oil to be the same in all regions of the formation. Furthermore, during the above-described coalescing of the oil droplets to form an oil layer, surfactants are released again locally so that the surfactant concentration increases at this location of the formation.

For surfactant flooding, it is therefore important for the optimum conditions for the formation of the microemulsion of the Winsor III type to have as little dependency as possible on the total concentration of the surfactant mixture used.

It was therefore an object of the invention to provide a surfactant mixture for use for surfactant flooding, in which the optimum conditions for formation of the microemulsion of the Winsor III type have as little dependency as possible on the total concentration of the surfactant mixture used.

Accordingly, a process for mineral oil production is found in which an aqueous surfactant formulation comprising at least one nonionic surfactant and at least one further surfactant is forced through at least one injection well into a mineral oil deposit and crude oil is removed from the deposit through at least one production well, the surfactant mixture at least comprising (A) at least one surfactant (A) of the general formula $R^1$—O—$(CH_2$—$CH_2$—$O)_x$—H, in which $R^1$ is a straight-chain or branched aliphatic and/or aromatic hydrocarbon radical having 8 to 32 carbon atoms and x is a number from 8 to 30, with the proviso that the polydispersity of the surfactant (A) is from 1.01 to 1.12, and (B) at least one surfactant (B) differing therefrom and of the general formula $R^2$—Y, in which $R^2$ is a straight-chain or branched aliphatic and/or aromatic hydrocarbon radical having 8 to 32 carbon atoms and Y is a hydrophilic group.

the weight ratio (A)/(B) being from 10:1 to 1:20, and the proportion of the surfactants (A) and (B) together being at least 50% by weight, based on the amount of all surfactants in the surfactant mixture used.

Furthermore, a surfactant mixture for mineral oil production which comprises the two surfactants (A) and (B) was found.

The following may be stated specifically regarding the invention:

In the process according to the invention for mineral oil production, an aqueous formulation which comprises at least one surfactant (A) and at least one surfactant (B) differing therefrom is used. It may moreover comprise further surfactants and/or other components.

Surfactants (A)

The surfactants (A) have the general formula $R^1$—O—$(CH_2$—$CH_2$—$O)_x$—H (I). One or more different surfactants (A) of the formula (I) can be used.

The radical $R^1$ is a straight-chain or branched, aliphatic and/or aromatic hydrocarbon radical having 8 to 32 carbon atoms, preferably 9 to 22, particularly preferably 9 to 18 and very particularly preferably 10 to 17 carbon atoms.

It is preferably a straight-chain or branched aliphatic hydrocarbon radical, in particular a straight-chain or branched aliphatic hydrocarbon radical having 9 to 18 carbon atoms.

A branched aliphatic hydrocarbon radical has as a rule a degree of branching of from 0.1 to 4.5, preferably from 1 to 3.5. The term "degree of branching" is defined here in a manner known in principle as the number of methyl groups in a molecule of the alcohol minus 1. The average degree of branching is the statistical mean value of the degrees of branching of all molecules of a sample.

In the above formula (I), x is a number from 8 to 30, preferably from 10 to 18 and very particularly preferably from 10 to 15.

For the person skilled in the art in the area of polyalkoxylates, it is clear that the numbers x are mean values of all molecules of a sample because, in the alkoxylation of alcohols with ethylene oxide, a certain distribution of chain lengths is obtained. The distribution can be described in a manner known in principle by the so-called polydispersity D. $D=M_w/M_n$ is the quotient of the weight average of the molar mass and the number average of the molar mass. The polydispersity can be determined by means of methods known to persons skilled in the art, for example by means of gel chromatography.

According to the invention, the polydispersity of the surfactants (A) used is from 1.01 to 1.12.

In a preferred embodiment of the invention, $R^1$ is a linear, aliphatic hydrocarbon radical, in particular a linear, aliphatic hydrocarbon radical having 9 to 18 carbon atoms, x being a number from 8 to 30, preferably from 8 to 18. Furthermore, the polydispersity of the surfactants (A) in said preferred embodiment is preferably from 1.01 to 1.06.

In a further preferred embodiment of the invention, $R^1$ is a branched, aliphatic hydrocarbon radical, x being a number from 10 to 30, preferably from 10 to 18. The polydispersity of the surfactants (A) in this second preferred embodiment is from 1.04 to 1.12.

The surfactants (A) can be prepared in a manner known in principle by the ethoxylation of corresponding alcohols $R^1$—OH. The procedure for alkoxylations is known in principle to the person skilled in the art. It is also known to the person skilled in the art that the molecular weight distribution of the alkoxylates can be influenced by the reaction conditions, in particular the choice of the catalyst.

According to the invention, the surfactants (A) are synthesized by means of techniques known in principle to the person skilled in the art, which lead to narrower molecular weight distributions than in the case of other synthesis methods, for example the base-catalyzed synthesis with KOH or alcoholates. By means of these techniques, the polydispersities according to the invention of the surfactants (A) of from 1.01 to 1.12 can be obtained.

For the synthesis of the surfactants (A), for example, double hydroxide clays as described in DE 43 25 237 A1 can be used as a catalyst. Furthermore, the synthesis can be carried out, for example, with the use of a catalyst selected from the group consisting of hydrophobized hydrotalcites, modified oxides or hydroxides of calcium, strontium or bariums or phosphates of lanthanum or lanthanides.

The alkoxylation can be particularly preferably effected with the use of double metal cyanide catalysts (DMC catalysts). Suitable DMC catalysts are disclosed, for example, in DE 102 43 361 A1, in particular paragraphs [0029] to [0041] and the literature cited therein, such as, for example, WO 00/74845 or WO 99/16775. For example, Zn—Co type catalysts can be used.

For carrying out the reaction, the catalyst can be added to the alcohol $R^1$—OH. By means of reduced pressure (for example <100 mbar) and/or by increasing the temperature (30 to 150° C.), water still present in the mixture can be removed. Thereafter, inert conditions are established with inert gas (e.g. nitrogen) and the ethylene oxide is added stepwise at temperatures of from 60 to 180° C. up to a pressure of not more than 10 bar. Usually, not more than 1000 ppm of catalyst, based on the mixture, are used and, owing to this small amount, the catalyst can remain in the product. The amount of catalyst may as a rule be less than 1000 ppm, for example 250 ppm or less.

Surfactants (B)

In addition to the at least one surfactant (A), the formulation used comprises at least one surfactant (B) differing therefrom and of the general formula $R^2$—Y (II). Of course, a mixture of a plurality of different surfactants (B) can also be used.

$R^2$ is a straight-chain or branched, aliphatic and/or aromatic hydrocarbon radical having 8 to 32 carbon atoms, preferably 9 to 28 and particularly preferably from 10 to 24 carbon atoms.

In the formula (II), Y is a hydrophilic group. The said group may in principle be any hydrophilic groups, provided the group is sufficiently polar in order to impart amphiphilic properties, i.e. surfactant properties, to the compound. Said surfactants may be nonionic surfactants or anionic, cationic or betaine surfactants.

Preferably, the group Y is a group selected from the group consisting of sulfate groups, sulfonate groups, polyoxyalkylene groups, anionically modified polyoxyalkylene groups, betaine groups, glucoside groups or amine oxide groups.

In an embodiment of the invention, the surfactant (B) is an anionic surfactant, in particular an anionic surfactant having sulfo groups without additional alkoxy groups. Examples of such surfactants comprise alkylbenzenesulfonates, olefinsulfonates, paraffinsulfonates, alkylcarboxylates, alkylsulfates and/or alkylphosphates.

In a further embodiment of the invention, the surfactant (B) is a surfactant selected from the group consisting of alkyl ether sulfonates, alkyl ether sulfates or alkyl ether carboxylates, the polyether group of the surfactant comprising in each case from 2 to 30 ether units. The ether units are preferably ethoxy and/or propoxy units. Alkyl ether sulfates which have predominantly propoxy units are very particularly preferred. Here, "predominantly" means that at least 50% of the ether units are propoxy units.

Further Surfactants

In addition to the surfactants (A) and (B), the formulation can moreover optionally also comprise surfactants (C) differing from (A) and (B).

Surfactants (C) may be in particular oligomeric or polymeric surfactants. With such polymeric cosurfactants, the amount of surfactant which is required for the formation of a microemulsion can advantageously be reduced. Such polymeric cosurfactants are therefore also referred to as "microemulsion boosters". Examples of such polymeric surfactants (C) comprise amphiphilic block copolymers which comprise at least one hydrophilic and at least one hydrophobic block. Examples comprise polypropylene oxide-polyethylene oxide block copolymers, polyisobutene-polyethylene oxide block copolymers and comb polymers having polyethylene oxide side chains and a hydrophobic main chain, the main chain preferably comprising substantially olefins or (meth)acrylates as structural units. The term "polyethylene oxide" is intended here in each case to include polyethylene oxide blocks according to the above definition which comprise propylene oxide units. Further details of such surfactants are disclosed in WO 2006/131541.

Preferred Combinations of Surfactants

The surfactants (A) and (B) and optionally (C) are selected by the person skilled in the art according to the conditions in the mineral oil formation to be treated.

A preferred combination here comprises surfactants (A) $R^1$—O—$(CH_2$—$CH_2$—O$)_x$—H, in which $R^1$ is a branched, aliphatic hydrocarbon radical having 8 to 32 carbon atoms and x is 11 to 40. Preferred numbers of carbon atoms and values for x have already been mentioned. Said surfactants (A) are combined with alkylbenzenesulfonates as surfactants (B) in the preferred combination.

A second preferred combination comprises branched aliphatic ethoxylates as surfactants (A) with organic sulfonates, preferably those selected from the groups consisting of olefinsulfonates, alkylbenzenesulfonates and alkyl ether sulfates, which comprise predominantly propoxy units. "Predominantly" means that at least 50% of the ether units are propoxy units.

Process for Mineral Oil Production

In the process according to the invention for mineral oil production, a suitable aqueous formulation of the surfactants (A) and (B) and optionally (C) is forced through at least one injection well into the mineral oil deposit and crude oil is removed from the deposit through at least one production well. A technique of this kind is also known as "surfactant flooding". In this context, the term "crude oil" does not of course mean single-phase oil but means the customary crude oil-water emulsions. As a rule, a deposit is provided with a plurality of injection wells and with a plurality of production wells. The principal effect of the surfactants here lies in the reduction of the interfacial tension between water and oil. This raises the mobility of the mineral oil in the deposit, and allows the production of mineral oil which without the use of surfactants would remain in the deposit. In this case the interfacial tension between water and oil ought to be lowered to values of less than 0.1 mN/m, preferably less than 0.01 mN/m.

After the forcing in of the surfactant formulation, water ("water flooding") or preferably a more highly viscous, aqueous solution of a polymer having a pronounced thickening effect ("polymer flooding") can be injected into the formation for maintaining the pressure. However, other known techniques are those in which the surfactants are first allowed to act on the formation. A further known technique is the injection of the solution comprising surfactant and polymer having a thickening effect, followed by a solution of polymer having a thickening effect. Details of the technical procedure of "surfactant flooding", "water flooding" and "polymer flooding" are known to a person skilled in the art and he uses a corresponding technique according to the type of deposit.

In one preferred embodiment of the invention the process of the invention for mineral oil production constitutes Winsor type III microemulsion flooding, i.e., the injected surfactant mixture in the deposit, together with the water phase and the oil phase present in the deposit, forms a Winsor type III microemulsion. Details of Winsor III microemulsions and their advantages have already been outlined earlier on above. For Winsor type III microemulsion flooding, the interfacial tension between water and oil ought to be lowered to values of less than 0.1 mN/m, preferably less than 0.015 mN/m, and more preferably less than 0.01 mN/m.

For the process according to the invention, an aqueous formulation of the surfactants (A), (B) and optionally (C) is used. The formulations described below are particularly suitable for Winsor III microemulsion flooding, but can also be used for other techniques of surfactant flooding.

In addition to water, the formulations can optionally also comprise organic solvents miscible with water or at least dispersible in water. Such additions serve in particular for stabilizing the surfactant solution during the storage or the transport to the oil field. However, the amount of such additional solvents should as a rule not exceed 50% by weight, preferably 20% by weight and particularly preferably 10% by weight. In a particularly advantageous embodiment of the invention, exclusively water is used for formulation. Examples of solvents miscible with water comprise in particular alcohols, such as methanol, ethanol or propanol, and also $C_1$- to $C_6$-monoalkyl ethers of mono- or oligoglycols having up to 6 alkylene oxide units, such as butylethylene glycol, butyldiethylene glycol or butyltriethylene glycol.

The weight ratio of the surfactants (A) and (B) to one another is, according to the invention, from 10:1 to 1:20, preferably from 3:1 to 1:10 and very particularly preferably from 2:1 to 1:4.

According to the invention the proportion of the surfactants (A) and (B) together is at least 50% by weight, based on the proportion of all surfactants present, i.e. the surfactants (A), (B) and optionally (C) together. Preferably, the proportion is at least 75% by weight, particularly preferably at least 90% by weight, and very particularly preferably only the surfactants (A) and (B) are used as surfactants in the formulation.

In addition to the surfactants, the formulations may also comprise further components, such as, for example, $C_4$- to $C_8$-alcohols and also their alkoxylates having up to 6 alkylene oxide units, and/or basic salts (so-called "alkali surfactant flooding"). With such additions, for example the retention in the formation can be reduced. The ratio of the alcohols, based on the total amount of surfactants used, is as a rule at least 1:1—however, it is also possible to use a substantial excess of alcohols. The amount of basic salts may typically range from 0.1% by weight to 5% by weight.

By the choice of the surfactants (A) and (B) and the weight ratio thereof to one another, the person skilled in the art can influence the optimum temperature for the formation of a microemulsion $T_{opt}$ and can adapt it to the temperature of the deposit. The deposits in which the process is used have as a rule a temperature of at least 20° C., for example from 20 to 150° C., preferably a temperature of at least 30° C. and particularly preferably at least 50° C., for example from 50 to 120° C.

The total concentration of all surfactants together is from 0.05 to 5% by weight, based on the total amount of the aqueous surfactant formulation, preferably from 0.1 to 2.5% by weight. The person skilled in the art makes a suitable choice according to the desired properties, in particular according to the conditions in the mineral oil formation. It is clear here to a person skilled in the art that the concentration of the surfactants may change after injection into the formulation because the formulation can mix with formation water or surfactants can also be absorbed on solid surfaces of the formation. It is the major advantage of the mixtures used according to the invention that the formation of a microemulsion is not excessively influenced by such a change in the total concentration.

For a person skilled in the art of surfactant flooding it is clear that the deposit conditions as well, such as the deposit temperature, the pressure, the nature of the oil in the deposit, and the nature and amount of salts that are present, for example, influence the conditions for optimum formation of a Winsor III microemulsion. Taking into account the indications above, a person skilled in the art is able by means of simple routine tests to optimize the surfactant formulation for application in very specific mineral oil deposits.

It is of course possible and as a rule also advisable first to prepare a concentrate which is diluted only on site to the desired concentration for injection into the formation. As a rule, the total concentration of the surfactants in such a concentrate is from 15 to 60% by weight, in particular 15 to 45% by weight.

The following examples are intended to illustrate the invention in more detail:

Part I: Synthesis of the Surfactants (A) Used

General Method 1: Ethoxylation by Means of KOH Catalysis

In a 2 l autoclave, an aqueous KOH solution which comprises 50% by weight of KOH is added to the alcohol to be ethoxylated (1.0 eq). The amount of KOH is 0.3% by weight of the product to be prepared. The mixture is dewatered at 100° C. and 20 mbar for 2 hours with stirring. Thereafter, flushing is effected three times with $N_2$, an admission pressure of about 1.3 bar $N_2$ is established and the temperature is increased to 120-130° C. The ethylene oxide is metered in so that the temperature remains from 125° C. to 135° C. Thereafter, further stirring is effected for 5 h at 125-135° C., flushing with $N_2$ is effected, cooling to 70° C. is effected and the reactor is emptied. The basic crude product is neutralized with the aid of acetic acid. Alternatively, the neutralization can also be effected with commercially available magnesium silicates, which are then filtered off. The pale product is characterized with the aid of a 1H-NMR spectrum in $CDCl_3$, gel permeation chromatography and an OH number determination and the yield is determined.

General Method 2: Ethoxylation by Means of DMC Catalysis

In a 2 l autoclave, the alcohol to be ethoxylated (1.0 eq) is mixed with a double metal cyanide catalyst (e.g. DMC catalyst from BASF, type Zn—Co) at 80° C. For activation of the catalyst, approx. 20 mbar is applied at 80° C. for 1 h. The amount of DMC is 0.1 percent by weight or less, based on the product to be prepared. Thereafter, flushing with $N_2$ is effected three times, an admission pressure of about 1.3 bar $N_2$ is established and the temperature is increased to 120-130° C. The ethylene oxide is metered in so that the temperature remains from 125° C. to 135° C. Thereafter, further stirring is effected for 5 h at 125-135° C., flushing with $N_2$ is effected, cooling to 70° C. is effected and the reactor is emptied. The pale product is characterized with the aid of a 1H-NMR spectrum in $CDCl_3$, gel permeation chromatography and an OH number determination and the yield is determined.

General Method 3: Sulfation by Means of Chlorosulfonic Acid

In a 1 l round-necked flask, the alkyl alkoxylate to be sulfated (1.0 eq.) is dissolved in 1.5 times the amount of dichloromethane (based on % by weight) and cooled to 5 to 10° C. Thereafter, chlorosulfonic acid (1.1 eq.) is added dropwise so that the temperature does not exceed 10° C. The mixture is allowed to warm up to room temperature and is stirred for 4 h at this temperature under an $N_2$ stream before the above reaction mixture is added dropwise to an aqueous NaOH solution with half the volume at not more than 15° C. The amount of NaOH is calculated so that there is a slight excess relative to the chlorosulfonic acid used. The resulting pH is about pH 9 to 10. The dichloromethane is removed under slightly reduced pressure on a rotary evaporator at no more than 50° C.

The product is characterized by 1H-NMR and the water content of the solution is determined (about 70%).

The following alcohols were used for the synthesis.

| Alcohol | Description |
| --- | --- |
| iC17 | iso-$C_{17}H_{35}$-OH; oxo alcohol, prepared by hydroformylation of isohexadecene which is obtained by tetramerization of butene. The average degree of branching of the alcohol is 3.1. |
| C16C18 | Commercially available fatty alcohol mixture consisting of linear $C_{16}H_{33}$-OH and $C_{18}H_{37}$-OH |

The alcohols were ethoxylated according to method 1 or 2. The respective degree of ethoxylation and the polydispersity obtained are summarized in table 1.

The polydispersity of the alkoxylated products was determined in each case by means of gel permeation chromatography (GPC).

The unit used was an Agilent 1200 series with pump, degasser, RI detector, autosampler and column thermostat, PSS 6.03 was used as software. The following columns were used:

precolumn SDV 5µ-8×50 mm
SDV 5µ 100 Å
SDV 5µ 1000 Å
SDV 5µ 100 000 Å

Calibration substances were DIN polystyrene from PSS. Toluene served as a standard. The eluent was tetrahydrofuran for chromatography. The flow rate was 1 ml/min. About 25 mg of the sample are dissolved in 1 ml of solvent (250 ml of THF—1.5 g of toluene), the toluene being mixed beforehand with the THF in order to obtain reproducible results.

The comparison of the polydispersities obtained by GPC shows that alcohol ethoxylates prepared by DMC catalysis have a narrower molecular weight distribution and hence lower polydispersity than alcohol ethoxylates prepared by KOH catalysis. This is clear from FIGS. 1 and 2.

TESTING OF PERFORMANCE CHARACTERISTICS

Figure 1:
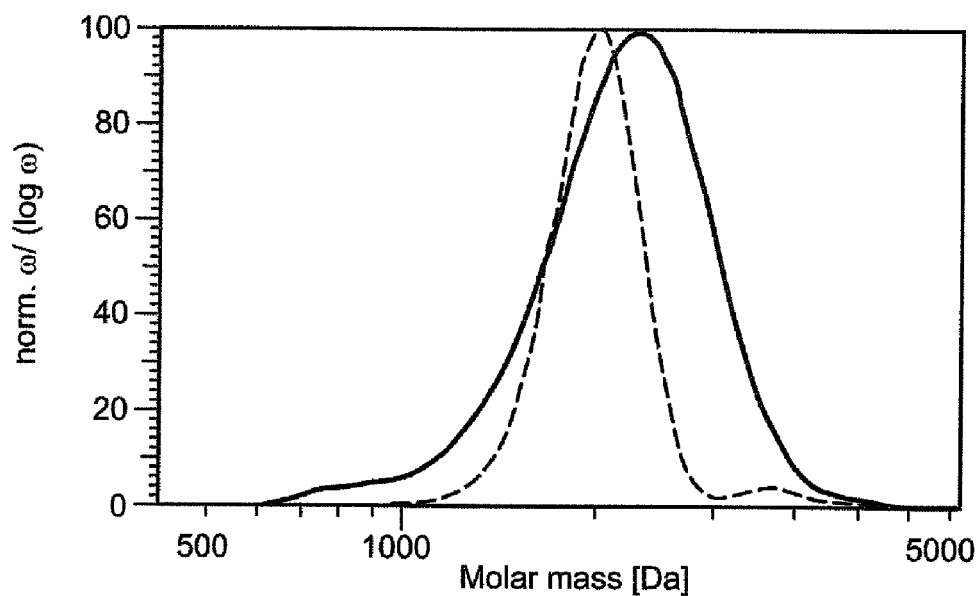
FIG. 1:
Molecular weight distribution $M_n$ determined by means of GPC for C16C18-alcohol, reacted with about 10.5 eq of EO. Outer curve (dark gray) according to method 1 (KOH catalysis). Inner curve (light gray) according to method 2 (DMC catalysis).
Figure 2:
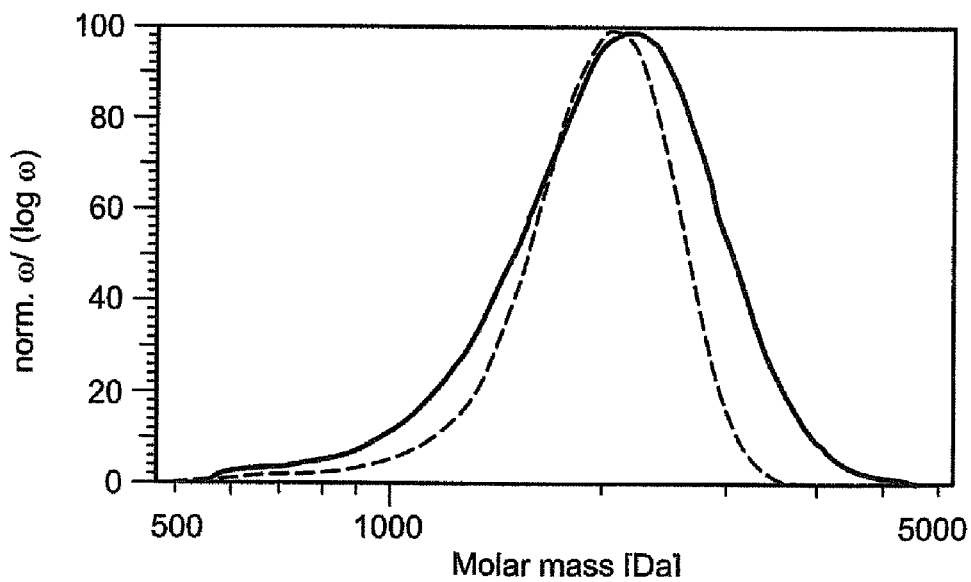
FIG. 2:
Molecular weight distribution determined by means of GPC for iC17-alcohol reacted with about 10.6 eq of EO. Outer curve (light gray) according to method 1 (KOH catalysis). Inner curve (dark gray) according to method 2 (DMC catalysis).

The following tests were carried out with the surfactants obtained, in order to rate their properties for tertiary mineral oil production.

Description of the Methods of Measurement

Determination of SP* a) Principle of the Measurement:

The interfacial tension between water and oil was determined in a known manner via the measurement of the solubilization parameter SP*. The determination of the interfacial tension by the determination of the solubilization parameter SP* is a method accepted among those skilled in the art for the approximate determination of the interfacial tension. The solubilization parameter SP* indicates how many ml of oil is dissolved per ml of surfactant used in a microemulsion (Winsor type III). The interfacial tension σ (IFT) can be calculated therefrom via the approximation formula IFT≈0.3/(SP*)$^2$ if equal volumes of water and oil are used (C. Huh, J. Coll. Interf. Sc., vol. 71, no. 2 (1979)).

b) Working Method

For determining the SP*, a 100 ml measuring cylinder with magnetic stirring rod is filled with 20 ml of oil and 20 ml of water. 10, 5, 2.5, 1.2 or 0.6 percent by weight of surfactant, based on the water phase, are added thereto. Thereafter, the temperature is increased stepwise from 20 to 90° C., and the temperature range within which a microemulsion formed is observed.

The formation of the microemulsion can be observed visually or with the aid of conductivity measurements. A three-phase system (upper phase oil, middle phase microemulsion, lower phase water) forms. If upper and lower phase are of the same magnitude and moreover nothing changes over a period of 12 h, the optimum temperature ($T_{opt}$) of the microemulsion has been found. The volume of the middle phase is determined. The volume of added surfactant is subtracted from this volume. The value obtained is then divided by two. This volume is now divided by the volume of added surfactant. The result is noted as SP*.

The type of oil and water used for determining SP* is determined according to the system to be investigated. Firstly, mineral oil itself can be used, or a model oil, such as, for example, decane or hexadecane. Both pure water and saline water can be used as water in order better to model the conditions in the mineral oil formation. The composition of the aqueous phase can be adjusted, for example, according to the composition of a certain reservoir water.

Information on the aqueous phase used and the oil phase is to be found below in the specific description of the experiments.

Test Results:

A 1:1 mixture of decane and a water having a high salt content was used (salt content in percent by weight: 13.2% of NaCl, 4.26% of CaCl$_2$, 1.05% of MgCl$_2$, 0.03% of Na$_2$SO$_4$).

A surfactant mixture comprising the alkyl ethoxylate used in each case and the dodecylbenzenesulfonate was added thereto. The total surfactant concentration varied from 10.0 percent by weight to 0.6 percent by weight of the water phase. The results are listed in tables 1 and 2. Here, $\Delta T_{opt}$ is in each case the difference between the largest and the smallest $T_{opt}$ of each experimental series.

TABLE 1

List of the results with surfactants (A) based on iC$_{17}$-alcohols

| Example no. | Surfactant (A) | Method | D | Surfactant (B) | Weight ratio (A)/(B) | Total concentration of the surfactants [%] | $T_{opt}$ [° C.] | SP* | IFT [mN/m] at $T_{opt}$ | $\Delta T_{opt}$ [° C.] |
|---|---|---|---|---|---|---|---|---|---|---|
| C 1 | iC17 - 14.0 EO—H | 1 KOH | 1.11 | C$_{12}$H$_{25}$PhSO$_3$Na | 2:1 | 10.0 | 57 | 4.4 | 0.0155 | 8 |
| | | | | | | 5 | 60 | 3.5 | 0.044 | |
| | | | | | | 2.5 | 62 | 3 | 0.033 | |
| | | | | | | 1.2 | 65 | 2.6 | 0.0444 | |
| | | | | | | 0.6 | 65 | 2.6 | 0.0444 | |
| Example 1 | iC17 - 13.1 EO—H | 2 DMC | 1.06 | C$_{12}$H$_{25}$PhSO$_3$Na | 2:1 | 10.0 | 52 | 4.9 | 0.0125 | 4 |
| | | | | | | 2.5 | 53 | 4.3 | 0.0162 | |
| | | | | | | 0.6 | 57 | 3.7 | 0.0219 | |
| C 2 | iC17 - 10.6 EO—H | 1 KOH | 1.13 | C$_{12}$H$_{25}$PhSO$_3$Na | 2:1 | 10.0 | 35 | >10 | <0.003 | 17 |
| | | | | | | 5 | 40 | 9.5 | 0.0033 | |
| | | | | | | 2.5 | 42 | 9 | 0.0037 | |
| | | | | | | 1.2 | 48 | 7.8 | 0.0049 | |
| | | | | | | 0.6 | 52 | 4.7 | 0.0136 | |
| Example 2 | iC17 - 10.9 EO—H | 2 DMC | 1.07 | C$_{12}$H$_{25}$PhSO$_3$Na | 2:1 | 10.0 | 33 | 9 | 0.00370 | 2 |
| | | | | | | 2.5 | 32 | 9.25 | 0.00351 | |
| | | | | | | 0.6 | 31 | 7.8 | 0.00493 | |
| C 3 | iC17 - 10.6 EO—H | 1 KOH | 1.13 | C$_{12}$H$_{25}$PhSO$_3$Na | 4:1 | 10.0 | 37 | >9.5 | <0.0033 | 17 |
| | | | | | | 2.5 | 54 | 6 | 0.00833 | |
| | | | | | | 0.6 | 53 | 4 | 0.01875 | |
| Example 3 | iC17 - 10.9 EO—H | 2 DMC | 1.07 | C$_{12}$H$_{25}$PhSO$_3$Na | 4:1 | 10.0 | 42 | >9.5 | <0.0033 | 7 |
| | | | | | | 2.5 | 49 | 7.5 | 0.00533 | |
| | | | | | | 0.6 | 48 | 6 | 0.00833 | |
| C 4 | iC17 - 8 EO—H | 1 KOH | 1.16 | C$_{12}$H$_{25}$PhSO$_3$Na | 4:1 | 10.0 | 10 | >9.5 | <0.0033 | 26 |
| | | | | | | 2.5 | 26 | 30 | 0.00033 | |
| | | | | | | 0.6 | 36 | 8 | 0.00469 | |
| Example 4 | iC17 - 8.6 EO—H | 2 DMC | 1.12 | C$_{12}$H$_{25}$PhSO$_3$Na | 4:1 | 10.0 | 24 | >9.5 | <0.0033 | 12 |
| | | | | | | 2.5 | 31 | 16 | 0.00117 | |
| | | | | | | 0.6 | 36 | 9 | 0.00370 | |

TABLE 2

List of the results with surfactants(A) based on C16C18-alcohols

| Example no. | Surfactant (A) | Method | D | Surfactant (B) | Weight ratio (A)/(B) | Total concentration [%] | $T_{opt}$ [° C.] | SP* | IFT [mN/m] at $T_{opt}$ | $\Delta T_{opt}$ [° C.] |
|---|---|---|---|---|---|---|---|---|---|---|
| C 5 | C16C18 - 10.6 EO—H | 1 KOH | 1.11 | $C_{12}H_{25}PhSO_3Na$ | 2:1 | 10.0 | 48 | 8.5 | 0.0042 | 13 |
| | | | | | | 5 | 53 | 7 | 0.0061 | |
| | | | | | | 2.5 | 55 | 6.5 | 0.0071 | |
| | | | | | | 1.2 | 58 | 4.7 | 0.0136 | |
| | | | | | | 0.6 | 61 | 3.7 | 0.019 | |
| Example 5 | C16C18 - 10.5 EO—H | 2 DMC | 1.04 | $C_{12}H_{25}PhSO_3Na$ | 2:1 | 10.0 | 46 | >9.5 | <0.00332 | 2 |
| | | | | | | 2.5 | 47 | 9.3 | 0.00347 | |
| | | | | | | 0.6 | 49 | 7.8 | 0.00493 | |
| C 6 | C16C18 - 8.4 EO—H | 1 KOH | 1.10 | $C_{12}H_{25}PhSO_3Na$ | 2:1 | 10.0 | 30 | >9.5 | <0.00332 | 5 |
| | | | | | | 2.5 | 29 | 17.5 | 0.00098 | |
| | | | | | | 0.6 | 35 | 9.9 | 0.00306 | |
| Example 6 | C16C18 - 8.6 EO—H | 2 DMC | 1.03 | $C_{12}H_{25}PhSO_3Na$ | 2:1 | 10.0 | 32 | >9.5 | <0.00332 | 1 |
| | | | | | | 2.5 | 32 | 17.5 | 0.00098 | |
| | | | | | | 0.6 | 33 | 14 | 0.00153 | |
| C 7 | C16C18 - 8.4 EO—H | 1 KOH | 1.10 | $C_{12}H_{25}PhSO_3Na$ | 8:1 | 10.0 | 38 | >9.5 | <0.00333 | 17 |
| | | | | | | 2.5 | 47 | 6 | 0.00833 | |
| | | | | | | 0.6 | 55 | 4.7 | 0.01358 | |
| Example 7 | C16C18 - 8.6 EO—H | 2 DMC | 1.03 | $C_{12}H_{25}PhSO_3Na$ | 8:1 | 10.0 | 37 | >9.5 | <0.00333 | 11 |
| | | | | | | 2.5 | 42 | 9 | 0.00370 | |
| | | | | | | 0.6 | 48 | 8 | 0.00469 | |

The examples and comparative examples show that surfactants which are prepared using DMC catalysts and accordingly have lower polydispersities than surfactants obtained using the classical KOH catalysis give better results.

In the case of the alcohol ethoxylates prepared by DMC catalysis (method 2), the increase in the optimum temperature on reducing the total surfactant concentration is substantially less pronounced than in the case of compounds which have a comparable degree of ethoxylation but which are prepared by means of KOH catalysis; i.e. $\Delta T_{opt}$ is substantially smaller in each case for the compounds prepared by means of DMC catalysis.

This is of major importance for surfactant floodings of the deposit. Owing to the possible dilutions of the surfactant solution in the formation (for example by an underground aquifer, mixing with reservoir water), the surfactant concentration decreases. As a result, the optimum temperature of the surfactant solution would differ greatly from the temperature of the deposit, which would lead to an increase in the interfacial tension (departure from the microemulsion range of Winsor type III).

The surfactants prepared by means of DMC catalysis moreover have the advantage that their interfacial tension is almost always lower than in the case of the corresponding KOH-catalyzed alkyl ethoxylates. Example 3 and comparative example C 3 showed this very well at a temperature of about 40-50° C. The lower the interfacial tension, the lower are the capillary forces to be overcome and the higher is the subsequent mineral oil production. The effect of a lower interfacial tension is particularly pronounced in the case of the surfactants having a degree of ethoxylation of less than 11. In the case of the DMC catalysis, it is therefore possible to use surfactants having a lower degree of ethoxylation, low interfacial tensions nevertheless being achieved.

This has further advantages in use: surfactant mixtures are used by a person skilled in the art inter alia in order to be able to adjust the hydrophobic-hydrophilic balance of the surfactant system optimally to the conditions of the mineral oil formation. Thus, if a strongly hydrophilic surfactant is used, this must as a rule be compensated by a more strongly hydrophobic second surfactant. However, enhancement of the hydrophobicity of surfactants is difficult under certain circumstances. Thus, for example, a lengthening of the alkyl group of surfactant (B) is not always possible owing to the limited availability of correspondingly long-chain building blocks.

A surfactant (A) having a lower degree of ethoxylation is less hydrophilic than compounds having a higher degree of ethoxylation. Accordingly, a second surfactant need not be extremely hydrophobic. The person skilled in the art therefore gains thereby new degrees of freedom in the formulation.

In the case of branched alcohols (see table 1), a minimum degree of ethoxylation of 10 is sufficient in the case of surfactants according to method 2 and deposit temperatures of about 30° C. in order to achieve $T_{opt}$ of 5° C. or less (examples 2 and 4). Comparative example C2 (KOH catalysis) shows a substantially larger difference $\Delta T_{opt}$ at a degree of ethoxylation of 10. For deposit temperatures of 60° C., the use of surfactants having a minimum degree of ethoxylation of 13 is advisable (example 1).

In the case of linear alcohols (table 2), in general a minimum degree of ethoxylation of 8 is sufficient at a deposit temperature of 30° C. (example 6 and comparative example C6). The DMC-catalyzed compound (example 6), with a $\Delta T_{opt}$ of 1° C., once again shows better behavior than the KOH-catalyzed compound (comparative example C6 with $\Delta T_{opt}$ of 5° C.).

In a further series of experiments, the following investigations were carried out with the crude oil from a deposit in southern Germany:

The crude oil has an API of 33°.

The deposit temperature is around 55° C.

The reservoir water has a salt content of 3570 ppm TDS (total dissolved salt).

Added to an NaCl solution were 1% of $Na_2CO_3$, a surfactant mixture of 3 parts of $C_{16}C_{18}$-7PO-0.1EO sulfate and 1 part of dodecylbenzene sulfonate (Lutensit A-LBN 50 ex BASF) and also a variable amount of sec-butanol (s-BuOH)

or $C_{16}C_{18}$-10 EO (prepared by KOH catalysis; D=1.11) or $C_{16}C_{18}$-10 EO (prepared by DMC catalysis, D=1.04). The total surfactant concentration and the amount of $Na_2CO_3$ in percent by weight in the aqueous phase are reported. The solubility of the surfactant mixture is determined at different temperatures. The behavior of the binary system (saline water and surfactants) is specified in the table below at the temperatures at which microemulsion formation is observed in the presence of crude oil.

Next, the ternary system is investigated, by preparation of a 1:1 mixture of crude oil and the above saline surfactant solution. Optimum temperature $T_{opt}$ of the formation of microemulsions in accordance with Winsor type III is recorded.

Finally, interfacial tensions of crude oil in the presence of surfactant solutions are determined at 50° C. by the spinning drop method on a SVT20 from DataPhysics. For this purpose, a drop of oil is injected into a capillary filled with saline surfactant solution, at 50° C., and the expansion of the droplet is observed at approximately 4500 revolutions per minute until a constant value is established. This is typically the case after 2 hours. The interfacial tension IFT (or $\sigma_{II}$) is calculated—as described by Hans-Dieter Dörfler in "Grenzflächen and kolloid-disperse Systeme", Springer Verlag Berlin Heidelberg 2002—in accordance with the following formula, from the cylinder diameter $d_z$, the rotational speed $\omega$ and the density difference ($d_1-d_2$):

$$\sigma_{II}=0.25 d_z^3 \omega 2(d_1-d_2)$$

The results are compiled in Table 3.

For the formation of Winsor type III microemulsions within 1 to 2 hours' separation time, relatively high amounts of sec-butanol were required, as in comparative examples C8, C9 and C10. This severely detracts from the economics of the process. Moreover, the systems is highly sensitive to reduction in the total amount of formulation. The optimum temperature climbs from 35° C. to 62° C. This is extremely unfavorable against the background of concentration fluctuations in the flooding process as a result of adsorption or retention.

As can be seen in comparative examples C11, C12 and C13, the use of alkyl ethoxylates has the significant advantage that it allowed the amount of chemicals to be reduced significantly as compared with the formulations based on sec-butanol. It is found, however, that there is still a marked dependency of the optimum temperature on the amount of surfactant formulation employed. The increase, though now only 12° C., is nevertheless still significant.

Formulations based on alkyl ethoxylates of the same degree of ethoxylation but with a lower molecular weight distribution (polydispersity of 1.04 instead of 1.11) feature very good robustness, as is evident from examples 8, 9 and 10. The fluctuation in the optimum temperature is minimal (only 1° C.). It is possible, moreover, to operate with significantly fewer chemicals than in the case of sec-butanol.

Interfacial tension measurements at 50° C. produced very low values, which are ideal for the mobilization of mineral oil in deposits. Significantly lower concentrations were used than in the case of the phase investigations, in order to demonstrate the potential and the economics.

TABLE 3

| Example | Surfactant formulation | $Na_2CO_3$ | NaCl | $T_{opt}$ | Solubility in the binary system at $T_{opt}$ |
|---|---|---|---|---|---|
| C8 | 3% $C_{16}C_{18}$—7PO-0.1EO sulfate, 1% dodecylbenzenesulfonate, 8% s-BuOH | 1% | 2.5% | 35° C. | clear |
| C9 | 1.5% $C_{16}C_{18}$—7PO-0.1EO sulfate, 0.5% dodecylbenzenesulfonate, 4% s-BuOH | 1% | 2.5% | 56° C. | clear |
| C10 | 0.75% $C_{16}C_{18}$—7PO-0.1EO sulfate, 0.25% dodecylbenzenesulfonate, 2% s-BuOH | 1% | 2.5% | 62° C. | clear |
| C11 | 3% $C_{16}C_{18}$—7PO-0.1EO sulfate, 1% dodecylbenzenesulfonate, 2% $C_{16}C_{18}$-10EO (KOH, D = 1.11) | 1% | 3% | 53° C. | clear |
| C12 | 1.5% $C_{16}C_{18}$—7PO-0.1EO sulfate, 0.5% dodecylbenzenesulfonate, 1% $C_{16}C_{18}$-10EO (KOH, D = 1.11) | 1% | 3% | 63° C. | clear |
| C13 | 0.75% $C_{16}C_{18}$—7PO-0.1EO sulfate, 0.25% dodecylbenzenesulfonate, 0.5% $C_{16}C_{18}$-10EO(KOH, D = 1.11) | 1% | 3% | 65° C. | clear |
| 8 | 3% $C_{16}C_{18}$—7PO-0.1EO sulfate, 1% dodecylbenzenesulfonate, 2% $C_{16}C_{18}$-10EO (DMC, D = 1.04) | 1% | 3% | 49° C. | clear |
| 9 | 1.5% $C_{16}C_{18}$—7PO-0.1EO sulfate, 0.5% dodecylbenzenesulfonate, 1% $C_{16}C_{18}$-10EO (DMC, D = 1.04) | 1% | 3% | 49° C. | clear |
| 10 | 0.75% $C_{16}C_{18}$—7PO-0.1EO sulfate, 0.25% dodecylbenzenesulfonate, 0.5% $C_{16}C_{18}$-10EO (DMC, D = 1.04) | 1% | 3% | 50° C. | clear |

The results are compiled in Table 4.

TABLE 4

| Example | Surfactant formulation | $Na_2CO_3$ | NaCl | IFT | Solubility in the binary system at 50° C. |
|---|---|---|---|---|---|
| 11 | 0.15% $C_{16}C_{18}$—7PO-0.1EO sulfate, 0.05% dodecylbenzenesulfonate, 0.1% $C_{16}C_{18}$-10EO (DMC, D = 1.04) | 1% | 3% | 0.0038 mN/m | clear |
| 12 | 0.075% $C_{16}C_{18}$—7PO-0.1EO sulfate, 0.025% dodecylbenzenesulfonate, 0.05% $C_{16}C_{18}$-10EO (DMC, D = 1.04) | 1% | 3% | 0.0047 mN/m | clear |
| 13 | 0.0375% $C_{16}C_{18}$—7PO-0.1EO sulfate, 0.0125% dodecylbenzenesulfonate, 0.025% $C_{16}C_{18}$-10EO (DMC, D = 1.04) | 1% | 3% | 0.0029 mN/m | clear |

The invention claimed is:

1. A process for mineral oil production in which an aqueous surfactant formulation comprising at least one nonionic surfactant and at least one further surfactant is forced through at least one injection well into a mineral oil deposit and crude oil is removed from the deposit through at least one production well, wherein the surfactant mixture at least comprises
    (A) at least one surfactant (A) of the general formula $R^1$—O—$(CH_2$—$CH_2$—O$)_x$—H, in which $R^1$ is a straight-chain or branched aliphatic and/or aromatic hydrocarbon radical having 8 to 32 carbon atoms and x is a number from 8 to 30, with the proviso that the polydispersity of the surfactant (A) is from 1.01 to 1.12, and
    (B) at least one surfactant (B) differing therefrom and of the general formula $R^2$—Y, in which $R^2$ is a straight-chain or branched aliphatic and/or aromatic hydrocarbon radical having 8 to 32 carbon atoms and Y is a hydrophilic group,
    the weight ratio (A)/(B) being from 10:1 to 1:20, and the proportion of the surfactants (A) and (B) together being at least 50% by weight, based on the amount of all surfactants in the surfactant mixture used.

2. The process according to claim 1, wherein the preparation of the surfactants (A) is carried out by ethoxylation of alcohols $R^1$—OH using double metal cyanide catalysts.

3. The process according to claim 2, wherein $R^1$ is a linear, aliphatic hydrocarbon radical and x is a number from 8 to 30.

4. The process according to claim 2, wherein $R^1$ is a branched, aliphatic hydrocarbon radical and x is a number from 10 to 30.

5. The process according to claim 2, wherein the surfactant (B) is an anionic surfactant.

6. The process according to claim 1, wherein the preparation of the surfactants (A) is carried out by ethoxylation of alcohols $R^1$—OH using a catalyst selected from the group consisting of hydrophobized hydrotalcites, modified oxides or hydroxides of calcium, strontium or barium or phosphates of lanthanum or lanthanides.

7. The process according to claim 6, wherein $R^1$ is a linear, aliphatic hydrocarbon radical and x is a number from 8 to 30.

8. The process according to claim 6, wherein $R^1$ is a branched, aliphatic hydrocarbon radical and x is a number from 10 to 30.

9. The process according to claim 1, wherein $R^1$ is a linear, aliphatic hydrocarbon radical and x is a number from 8 to 30.

10. The process according to claim 9, wherein the polydispersity of the surfactant (A) is from 1.01 to 1.10.

11. The process according to claim 1, wherein $R^1$ is a branched, aliphatic hydrocarbon radical and x is a number from 10 to 30.

12. The process according to claim 11, wherein the polydispersity of the surfactant (A) is from 1.04 to 1.12.

13. The process according to claim 1, wherein the surfactant (B) is an anionic surfactant.

14. The process according to claim 1, wherein the group Y of the surfactant (B) is a group selected from the group consisting of sulfate groups, sulfonate groups, polyoxyalkylene groups, anionically modified polyoxyalkylene groups, betaine groups, glucoside groups or amine oxide groups.

15. The process according to claim 1, wherein the surfactant (B) is a surfactant selected from the group consisting of alkyl ether sulfonates, alkyl ether sulfates or alkyl ether carboxylates, the polyether group of the surfactant comprising in each case from 2 to 30 ether units.

16. The process according to claim 1, wherein the total concentration of all surfactants together is from 0.05 to 5% by weight, based on the total amount of the aqueous surfactant formulation.

17. The process according to claim 1, wherein the process is Winsor type III microemulsion flooding, wherein the injected surfactant mixture in the deposit, together with the water phase and the oil phase present in the deposit forms a Winsor type III microemulsion, the interfacial tension between water and oil being less than 0.1 mN/m.

18. The process according to claim 17, wherein the interfacial tension is less than 0.01 mN/m.

* * * * *